US008738621B2

(12) United States Patent
Hinrichs

(10) Patent No.: US 8,738,621 B2
(45) Date of Patent: May 27, 2014

(54) SYSTEMS AND METHODS FOR MANAGING FILES ON A STORAGE DEVICE

(75) Inventor: Joel H. Hinrichs, Centennial, CO (US)

(73) Assignee: EchoStar Technologies, L.L.C., Englewood, CO (US)

( * ) Notice: Subject to any disclaimer, the term of this patent is extended or adjusted under 35 U.S.C. 154(b) by 266 days.

(21) Appl. No.: 12/360,608

(22) Filed: Jan. 27, 2009

(65) Prior Publication Data

US 2010/0191779 A1    Jul. 29, 2010

(51) Int. Cl.
*G06F 7/00*   (2006.01)
*G06F 17/00*  (2006.01)
*G06F 17/30*  (2006.01)

(52) U.S. Cl.
USPC .............................. 707/737; 707/745; 707/747

(58) Field of Classification Search
None
See application file for complete search history.

(56) References Cited

U.S. PATENT DOCUMENTS

| | | | |
|---|---|---|---|
| 5,422,762 A | 6/1995 | Jerbic | |
| 5,715,455 A | 2/1998 | Macon et al. | |
| 5,819,298 A | 10/1998 | Wong et al. | |
| 5,968,186 A | 10/1999 | Itoh et al. | |
| 6,195,217 B1 | 2/2001 | Park | |
| 6,199,178 B1 | 3/2001 | Schneider et al. | |
| 6,815,112 B2 * | 11/2004 | Saito et al. | 429/454 |
| 6,829,688 B2 | 12/2004 | Grubbs et al. | |
| 6,898,686 B1 | 5/2005 | Perez | |
| 6,961,941 B1 | 11/2005 | Nelson et al. | |
| 7,372,873 B1 | 5/2008 | Kumar et al. | |
| 7,457,910 B2 | 11/2008 | Chang et al. | |
| 7,464,103 B2 * | 12/2008 | Siu et al. | 1/1 |
| 7,676,628 B1 * | 3/2010 | Compton et al. | 711/114 |
| 7,873,619 B1 * | 1/2011 | Faibish et al. | 707/705 |
| 8,072,860 B2 | 12/2011 | Buban et al. | |
| 8,321,397 B2 | 11/2012 | Chun et al. | |
| 2002/0093691 A1 | 7/2002 | Durrant et al. | |
| 2002/0174139 A1 | 11/2002 | Midgley et al. | |
| 2004/0030951 A1 | 2/2004 | Armangau | |
| 2004/0123057 A1 | 6/2004 | Freudenschuss | |
| 2004/0148470 A1 * | 7/2004 | Schulz | 711/137 |
| 2004/0158834 A1 | 8/2004 | Ham et al. | |
| 2005/0027748 A1 | 2/2005 | Kisley | |

(Continued)

FOREIGN PATENT DOCUMENTS

| | | | |
|---|---|---|---|
| KR | 1020060095393 A | 8/2006 |
| WO | 9716023 A | 5/1997 |
| WO | 2006020094 A | 2/2006 |

OTHER PUBLICATIONS

PCT International Search Report and Written Opinion for Application PCT/US2010/021750, issued Sep. 6, 2010.

(Continued)

*Primary Examiner* — Susan Chen
(74) *Attorney, Agent, or Firm* — Ingrassia Fisher & Lorenz, P.C.

(57) ABSTRACT

Described herein are techniques for the dynamic allocation of storage capacity between multiple namespaces associated with a storage system. Data from multiple namespaces is stored in a common pool of addresses of the storage system and data from each namespace is capable of being written to any free address of the storage system at any time. Metadata associated with each of the files stored in the storage system is maintained that tracks the particular storage address or addresses and namespace associated with the file. Storage capacity can be dynamically allocated between multiple namespaces by writing data to free blocks and updating the metadata accordingly.

21 Claims, 9 Drawing Sheets

(56) References Cited

U.S. PATENT DOCUMENTS

| | | | |
|---|---|---|---|
| 2005/0149776 | A1 | 7/2005 | Hinrichs |
| 2005/0193232 | A1 | 9/2005 | Diehl |
| 2006/0117133 | A1 | 6/2006 | Hinrichs |
| 2007/0033356 | A1 | 2/2007 | Erikhman |
| 2007/0067554 | A1 | 3/2007 | Hinrichs |
| 2007/0220490 | A1 | 9/2007 | Kobayashi |
| 2008/0072219 | A1 | 3/2008 | Kabadiyski |
| 2008/0148233 | A1* | 6/2008 | Clemm et al. ............. 717/121 |
| 2008/0270719 | A1 | 10/2008 | Cochran et al. |
| 2009/0172276 | A1* | 7/2009 | Nochimowski et al. ...... 711/114 |
| 2009/0222509 | A1* | 9/2009 | King et al. ................... 709/203 |

OTHER PUBLICATIONS

PCT International Search Report and Written Opinion for Application PCT/US2009/041567, issued Jul. 24, 2009.

Krishnan, Swetha et al., "The Effects of Metadata on NFS", Department of Computer Sciences, University of Wisconsin-Madison: StorageSS '07: Oct. 29, 2007.

Hutchinson, Normal C. et al., "Logical vs. Physical File System Backup": originally published in the Proceedings of the 3rd Symposium on Operating System Design and Implementation. New Orleans, Louisiana, Feb. 1999.

Digital Research, "CP/M-86 Operating System System Guide," 1981.

Wikipedia, "File Allocation Table," article from the Internet at http://en.wikipedia.org/w/index.php?title=File_Allocation_Table&printable=yes, Apr. 24, 2008, pp. 1-22.

United States Patent and Trademark Office, Notice of Allowance for U.S. Appl. No. 12/109,019, dated May 23, 2012.

Joel Henry Hinrichs Jr., Office Action for U.S. Appl. No. 12/109,019, dated Aug. 3, 2011.

USPTO, Non-Final Office Action, mailed Aug. 15, 2013 for U.S. Appl. No. 13/614,998.

China State Intellectual Property Office, First Office Action, dated Jul. 19, 2013 for China Patent Appln. No. 2010800003212.5.

Canadian Intellectual Property Office, Office Action, dated Sep. 17, 2013 for Canadian Patent Application No. 2,749,918.

* cited by examiner

FAT based metadata

FILE #1
public
namespace
301

FILE #2
private
namespace
302

FILE #4
application
namespace
304

400

File Allocation Table (FAT)

| (block 304 index) next: 309 | (block 305 index) next: | (block 306 index) next: | (block 307 index) next: |
| (block 308 index) next: 312 | (block 309 index) next: 310 | (block 310 index) next: | (block 311 index) next: |
| (block 312 index) next: | (block 313 index) next: | (block 314 index) next: | (block 315 index) next: 319 |
| (block 316 index) next: | (block 317 index) next: | (block 318 index) next: | (block 319 index) next: |

*FIG. 4*

SYSTEMS AND METHODS FOR MANAGING FILES ON A STORAGE DEVICE

BACKGROUND

Computing devices often include a mass storage device, such as a disk drive, flash memory or other type of non-volatile memory used to store data associated with the computing device. The mass storage device provides long-term storage for files, such as word processing documents, e-mails, photos, music and videos. Sometimes, the capacity of a storage device can be allocated between multiple uses. For example, the capacity of a disk drive in a digital video recorder (DVR) can be allocated between storage of user selected recordings and operator selected recordings. In other words, the user is entitled to a certain capacity of the disk drive for storing selected television programs and the system operator is entitled to a remaining capacity of the disk drive to push specific programs (e.g., movies) to the DVR which are stored so that a user may then watch the content on-demand if they desire. In this scenario, the disk drive may be partitioned into two or more virtual storage devices which the DVR can selectively access through different namespaces.

The problem with this scenario is that the competing uses require prior fixed area allocations and there is little flexibility to dynamically allocate space between the two uses. For example, some users may not watch on-demand movies, but may desire to utilize the entire capacity of the disk drive of the DVR for storing their own selected content. Likewise, some users may record very few selected programs, but may be frequent users of the on-demand content. Thus, the users may desire the system operator to make a larger selection of content available on-demand via the DVR. In both scenarios, the storage capacity of the disk drive of the DVR is underutilized and users would benefit from a flexible allocation of the storage capacity depending on their desired usage pattern.

BRIEF DESCRIPTION OF THE DRAWINGS

The same number represents the same element or same type of element in all drawings.

FIG. 4 illustrates an embodiment of mapping information after the deletion of File #3.

DETAILED DESCRIPTION

Figures 1, 2:
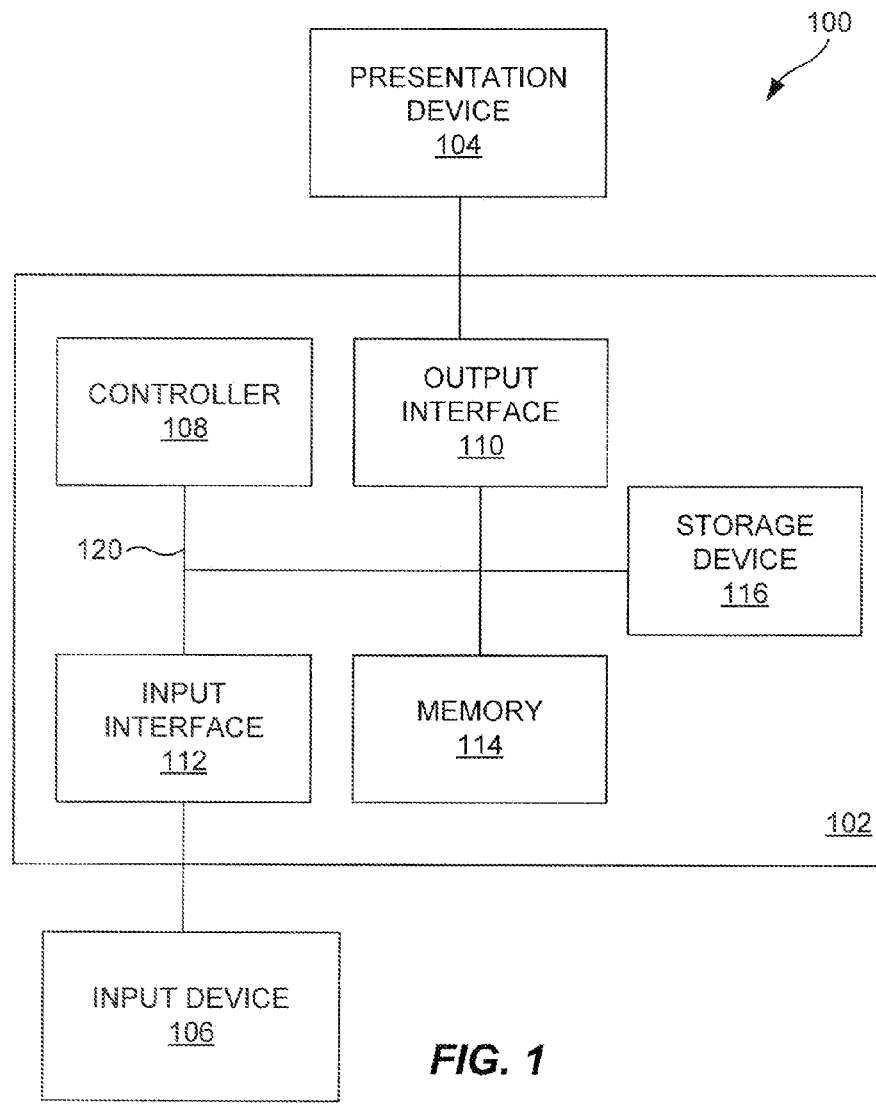
FIG. 1 illustrates an embodiment of a computing system.
FIG. 2 illustrates an embodiment of physical blocks of the storage device of FIG. 1.

The various embodiments described herein generally provide apparatus, systems and methods for facilitating the storage of data in non-volatile memory. More particularly, the embodiments described herein provide for the dynamic allocation of storage capacity between multiple namespaces associated with a storage system. Data from multiple namespaces is stored in a common pool of blocks of the storage system. Metadata associated with each of the files stored in the storage system is maintained that tracks the particular storage block address or addresses and namespace associated with the file.

Because data from multiple namespaces is stored within a common pool of blocks, data from each namespace is capable of being written to any free block of the storage system at any time. This allows for the dynamic allocation of storage capacity between competing namespaces in real-time, because particular storage blocks are not allocated to particular namespaces. For example, a particular block may initially store first data associated with a first namespace. The first data may then be subsequently deleted by the associated computing system. Subsequently, the storage system may re-utilize the block to store second data associated with a second namespace.

In some embodiments, data from different namespaces or virtual storage devices may be stored in contiguous physical blocks of the storage device. For example, ten sequential storage blocks of a storage device may hold data from three different namespaces. Data from a plurality of unrelated namespaces may be stored in contiguous blocks on a single storage medium.

In some embodiments, data files stored by a data storage system may be stored in a first data storage region. Metadata associated with the data files may be stored in a second data storage region of a data storage system or an associated host system. For example, the data files may be stored in a first region of a disk drive, flash memory device or other type of storage device. On the other hand, the metadata may be stored in a second data storage region of the same storage medium designated for storing the metadata. In other words, the metadata may be stored in the disk drive, flash memory device or the like in a dedicated region of the storage device. In at least one embodiment, the metadata may be stored in another type of memory than the storage medium storing the data files. For example, the data files may be stored on a magnetic storage medium, e.g., a disk drive, and the metadata may be stored in random access memory (RAM) or other type of primary memory associated with the data storage device. The RAM may be generally associated with a computing device, e.g., the RAM of a computer or the RAM may be particularly associated with a memory controller of a data storage device, i.e., may be physically located inside of the disk drive.

For the purposes of this description "FAT based metadata" and "FAT" are interchangeable; both refer to a system of storing various information regarding the presence, identity, and various attributes of one or a plurality of files in an organized manner, using a technique commonly known in the art as "FAT" or "file allocation table" to describe the way each file progresses from one block to another on a storage medium.

In at least one embodiment, a storage device stores a FAT based metadata describing a namespace tree containing one or a plurality of namespaces. A namespace or namespace tree consists of nodes. Nodes which have dependent nodes are known as directories; other nodes which have dependent data areas are known as files. The FAT based metadata generally includes one record for each node in the namespace tree, with each record including information identifying the node by name, type, and dependents, e.g. a first block of the storage device associated with the file when the node is a file node.

The FAT based metadata may be maintained by either the computing system or the memory controller of the storage device depending on desired design criteria.

In at least one embodiment the FAT is stored in a designated region of the storage device and the FAT is updated as applicable responsive to read/write commands. In some embodiments, the FAT may be stored in a volatile memory of the computing device and/or the storage device, such as RAM associated with the computing device and/or RAM associated with a memory controller of the storage system. In at least one embodiment, the FAT data stored in the volatile memory may be periodically stored in a designated region of the storage device. Co-pending application Ser. No. 12/109,019, entitled "Systems and Methods for Reliably Managing Files in a Computer System", filed Apr. 24, 2008, which is hereby incorporated by reference in its entirety, describes a system for maintaining metadata in memory regarding a plurality of files stored on a data storage medium and periodically storing snapshots of the metadata on the data storage medium for subsequent retrieval.

For convenience, the concepts presented herein are frequently described with reference to a television receiver (e.g., a set-top box) or similar system that is capable of receiving television signals and generating video imagery on a display. However, the teachings described herein are not limited to television receivers and may be readily adapted and deployed in any other type of computing system. Examples of other computing systems that could incorporate the concepts described herein include personal computers, servers, digital cameras, audio or video media players, satellite or terrestrial radio receivers, audio/video systems and components (e.g., compact disc or digital video disc players, audio or video components associated with automobiles, aircraft or other vehicles, stereo receivers and/or amplifiers, jukeboxes, and/or the like), portable telephones and/or any other devices or systems. It is to be appreciated that any device or system that incorporates a storage device (such as a disk drive or flash memory) and that has a manageable set of file system metadata could benefit from the concepts described herein.

FIG. 1 illustrates an embodiment of a computing system 100. The computing system includes a computer 102, a presentation device 104 and an input device 106. Each of these components is described in greater detail below. The computing system 100 may include other elements, components or devices not illustrated for the sake of brevity.

The computer 102 may include any type of computing device, such as a television receiver, personal computer, laptop, server or the like. The computer 102 includes a controller 108, an output interface 110, an input interface 112, a memory 114 and a storage device 116. The components of the computer 102 may be communicatively coupled together by one or more data buses 120 or other type of data connection.

The controller 108 is operable for controlling the operation of the computer 102. As used herein, controller 108 refers to a single processing device or a group of inter-operational processing devices. The operation of controller 108 may be controlled by instructions executable by controller 108. Some examples of instructions are software, program code, and firmware. Various embodiments of controller 108 include any sort of microcontroller or microprocessor executing any form of software code.

The controller 108 is communicatively coupled to the memory 114, which is operable to store data during operation of the controller 108. Such data may include software and firmware executed by the controller 108 as well as system and/or program data generated during the operation of the controller 108. Memory 114 may comprise any sort of digital memory (including any sort of read only memory (ROM), RAM, flash memory and/or the like) or any combination of the aforementioned. In at least one embodiment, the memory 114 is operable to store metadata regarding a file tree containing files generated, utilized, stored and/or accessed by the computer 102. In at least one embodiment, the file metadata may include a FAT. The memory 114 may also be referred to herein as "primary memory".

The computer 102 also includes a storage device 116, which is any kind of mass storage device operable to store files and other data associated with the computer 102. In at least one embodiment, the storage device 116 comprises a magnetic disk drive that provides non-volatile data storage. In another embodiment, the storage device 116 may comprise flash memory. It is to be appreciated that the storage device 116 may be embodied as any type of magnetic, optical or other type of storage device capable of storing data, instructions and/or the like. The computer 102 manages the files and/or directories stored on the storage device with a collection of metadata associated with the files and/or directories. The metadata may be stored in the memory 114, on the storage device 116, or a combination thereof. The storage device 116 may also be referred to herein as "secondary memory."

The computer 102 also includes an output interface 110 operable to interface with the presentation device 104. More particularly, the output interface 10 is operable to output information for presentation by the presentation device 104. The output interface 110 may be operable to output any type of presentation data to the presentation device 104, including audio data, video data, audio/video (A/V) data, textual data, imagery or the like. In other embodiments, the output interface 110 may comprise a network interface operable to transmit data to other components, devices or elements, such as other computers, servers and the like.

The presentation device 104 may comprise any type of device capable of presenting data received from the computer 102. In at least one embodiment, the presentation device 104 comprises a monitor communicatively coupled to the output interface 110 via any type of appropriate wired or wireless connection. In another embodiment, the presentation device 104 comprises a television communicatively coupled to the output interface 110 via video or A/V cabling, such as component A/V cables, composite A/V cables, High-Definition Multimedia Interface (HDMI) cables, S-video cables, coaxial cables or a wireless connection, e.g., WiFi, Bluetooth and the like. In at least one embodiment, the presentation device 104 comprises an audio receiver and/or one or more speakers for outputting audio data, such as music.

It is to be appreciated that the computer 102 and the presentation device 104 may be separate components or may be integrated into a single device. For example, the computer 102 may comprise a set-top box (e.g., a cable television or satellite television receiver) and the presentation device 104 may comprise a television communicatively coupled to the set-top box. In another example, the computer 102 and the presentation device 104 may be embodied as a laptop with an integrated display screen or a television with an integrated cable receiver, satellite receiver and/or DVR.

The input interface 112 is operable to interface with one or more input devices 106. The input device 106 may comprise any type of device for inputting data to the computer 102. More particularly, data received from the input device 106 may be used to control the operation of the controller 108 and/or the output of data to the presentation device 104. The input interface 112 and the input device 106 may be communicatively coupled using any type of wired or wireless connection, including USB, WiFi, Infrared and the like. In some embodiments, the input interface 112 may comprise a wireless receiver for receiving any type of RF or IR communication from the input device 106. Exemplary input devices 106 include keyboards, mice, buttons, joysticks, microphones, remote controls, touch pads and the like. In at least one embodiment, the computer 102 comprises a television receiver and the input device 106 comprises a television remote control communicatively coupled to the television receiver.

The input device 106 may be further operable to control the operation of the presentation device 104. For example, the presentation device 104 may comprise a television that is remotely controlled by the input device 106 using IR or RF signals. In at least one embodiment, the input device 106 may be integrated with the presentation device 104. For example, the input device 106 and the presentation device 104 may comprise a touch screen display. The input device 106 may also be integrated with the computer 102. For example, the input device 106 may comprise buttons of the computer 102, such as an integrated keyboard of a laptop or a front panel display with buttons of a television receiver or other type of entertainment device.

As previously described, the computer 102 is operable to store data on the storage device 116. A single physical storage device 116 may be configured as multiple virtual partitions each associated with a particular namespace. For example, the first namespace may be assigned the identifier "public" whereas the second namespace may be assigned the identifier "private". Files on the storage device 116 may be accessed by an operating system of the computer 102 and/or software operating on the computer 102 by specifying a pathname of the file. The pathname of the file includes the associated namespace of the file, e.g., public/file1. File names and paths are unique within a particular namespace. Thus, public/file1 and private/file1 specify two different files in two different namespaces.

In one technique for partitioning a storage device into multiple namespaces, particular address ranges of physical storage blocks are assigned to a particular namespace at any time. This means that a namespace has a set storage allocation at any particular time and the storage device 116 needs to be repartitioned to reallocate storage capacity between multiple namespaces. FIG. 2 illustrates an embodiment of physical blocks of the storage device 116 of FIG. 1. The storage device 116A includes eight physical block addresses 201-208 each operable to store a specified number of bytes of data.

For example, blocks 201-204 may be assigned to namespace "public" whereas blocks 205-208 are assigned to namespace "private". To facilitate retrieval of particular files, the computer 102 stores metadata describing particular physical locations of the storage device 116 where files are located. For example, the computer 102 may store two FAT based metadatas, one for the "public" drive and another for the "private" drive. The first metadata may exhibit logical block addresses 0-3 for namespace "public" and the second may exhibit logical block addresses 0-3 for the namespace "private".

The logical addresses may be translated by either the controller 108 or a memory controller of the storage device 116 into the physical location of the data corresponding with the logical address. For example, in a disk drive system, physical storage blocks of the storage device 116 may be identified by their cylinder or track number and its sector or block number within the track. In addition, where a disk drive includes multiple storage media services each with an independent read/write head, a particular head or surface number may identify the surface on which a particular physical block or sector is located. Such physical addresses are often referred to as "CHS" (an acronym for cylinder, head, and sector). However, the physical addresses are typically presented by the disk drive to a host system as logical addresses which map to specific CHS locations. Such logical addresses are typically a sequential range of logical block numbers from zero through N where N is the maximum number of physical sectors or blocks available on the disk drive storage media.

The host may therefore address or identify a particular physical block by its logical block address rather than by the more complex and cumbersome CHS designation. A memory controller component of the disk drive then translates or maps a provided logical block address into a corresponding physical location (typically, a CHS address designation).

Table #1 below illustrates an embodiment of a listing of files associated with the computer 102. For simplicity of discussion, each file utilized in the example has a size equal to one block of the storage device 116A.

TABLE #1

| Files associated with computer 102 File pathname |
| --- |
| public/photo1.jpg |
| public/photo2.jpg |
| private/mysong1.mp3 |
| private/mysong2.mp3 |
| public/resume.doc |
| private/ mysong3.mp3 |
| private/ mysong4.mp3 |

Table #1 lists seven files, hypothetically stored on storage device 116A. Now let the computer 102 (see FIG. 1) store two FAT based metadatas, one associated with namespace "public" and another associated with namespace "private". The two metadatas are illustrated in Tables 2 and 3, which include the virtual block address of each file and the translated physical block addresses of each virtual block address, which are generated based on the virtual block address and the mapping information.

TABLE #2

FAT and translated physical addresses for namespace "public"

| Virtual address | File name | Translated physical block address |
| --- | --- | --- |
| 0 | photo1.jpg | 201 |
| 1 | photo2.jpg | 202 |
| 2 | resume.doc | 203 |
| 3 | Free block | 204 |

TABLE #3

FAT and translated physical addresses for namespace "private"

| Virtual address | File name | Translated physical block address |
| --- | --- | --- |
| 0 | mysong1.mp3 | 205 |
| 1 | mysong2.mp3 | 206 |
| 2 | mysong3.mp3 | 207 |
| 3 | mysong4.mp3 | 208 |

As illustrated in the above example, physical block 204 a.k.a. virtual block 4 does not presently store any data. Now, take for example the situation where the computer 102 needs to store the file private/mysong5.mp3 on the storage device 116A. However, the FAT for namespace "private" indicates that no free blocks are available in the "private" namespace pool of addresses. Even though block 204 is free, it cannot be utilized for storing file private/mysong5.mp3 because the free block is not within the pool of addresses associated with the FAT for namespace C. Thus, the computer 102 is unable to store the file private/mysong5.mp3.

This is a problem, because the computer 102 is unable to utilize the remaining storage capacity of storage device 116A in order to store the file private/mysong5.mp3. However, this problem is solved in accordance with another storage technique described below. Particularly, multiple namespaces are allocated addresses from a common pool of blocks. Thus, unlike the previously described technique, which assigns particular pre-defined regions of a storage device to particular namespaces, every block 201-208 of the storage device 116A may be assigned to any namespace of the computer 102 at any time, depending on whether the block is free to store data. Further, a single FAT based metadata is utilized to maintain a listing of files for both namespaces. The metadata includes a field for storing the namespace associated with a particular file. Table #4 illustrates an embodiment of a metadata which includes the virtual block address of each file within the namespace, logical block address of each file, the namespace associated with the file and the translated physical block address of each logical block address.

TABLE #4

FAT and translated physical addresses for both namespaces

| Namespace | Virtual address | Logical address | File name | Translated physical block address |
|---|---|---|---|---|
| public | 0 | 0 | photo1.jpg | 201 |
| public | 1 | 1 | photo2.jpg | 202 |
| public | 2 | 2 | resume.doc | 203 |
|  | 3 | 3 | FREE BLOCK | 204 |
| private | 0 | 4 | mysong1.mp3 | 205 |
| private | 1 | 5 | mysong2.mp3 | 206 |
| private | 2 | 6 | mysong3.mp3 | 207 |
| private | 3 | 7 | mysong4.mp3 | 208 |

As illustrated in the above example, block 204 does not presently store any data and is not associated with either namespace. Now, take for example the situation where the computer 102 needs to store the file private/mysong5.mp3 on the storage device 116A. The computer 102 identifies that block 204 is free, stores the data associated with the file at the physical location of block 204 and updates the metadata and its FAT accordingly to reflect the storage of data at block 204.

This technique allows for the dynamic allocation of storage capacity between multiple namespaces as needed. For example, after the file private/mysong5.mp3 is stored, an administrative change alters the relative capacity of the storage device 116A utilized by the "public" and "private" namespaces such that one namespace may use a larger share of the total capacity of storage device 116A, and the other namespace a smaller share. As additional storage operations are performed, the amount of storage on the storage device 116A which is used by each namespace will tend to shift accordingly.

For example, a subsequent operation may delete a particular file or the data stored in a particular block 201-208. The deletion operation frees the block for storage of data by either of the namespaces. Further, administrative operations expand the storage capacity granted to one namespace and shrink the capacity granted to the other. Following these two events, the namespace which did not free the storage may be able to expand one of its files, while the namespace which freed the storage may not be able to allocate new storage.

The technique may also be applied to the situation where data does not fit within a single block. Data for a single file does not need to be stored within contiguous blocks. Rather, data for a single file can be scattered across any free physical block addresses of the storage device 116A. In at least one embodiment, the metadata includes a pointer for the first block associated with the file and the namespace associated with the file. Further, the FAT entry for each block includes a pointer to the next block associated with the file.

Figure 3:
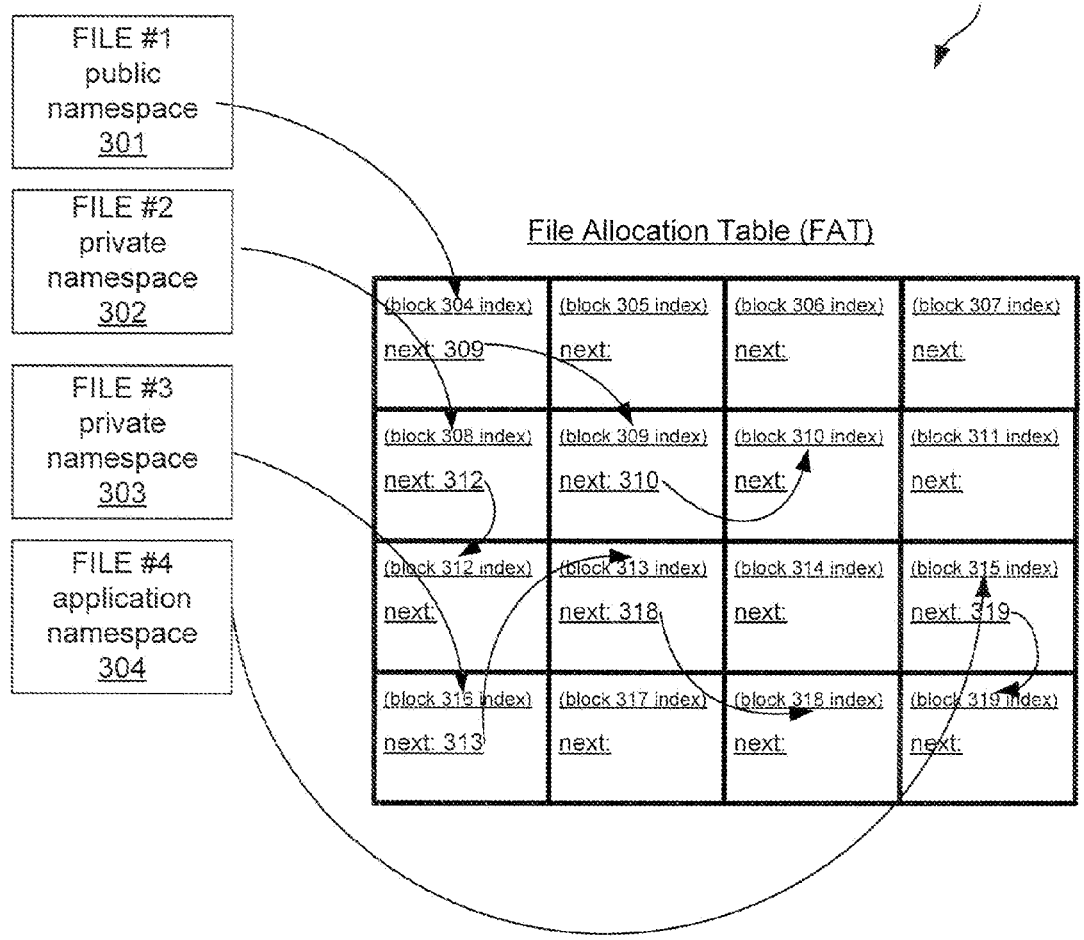
FIG. 3 illustrates a mapping of files in multiple namespaces to a common pool of storage blocks of a storage device.

FIG. 3 illustrates mapping information 300 of files in multiple namespaces to a common pool of storage blocks of a storage device. More particularly, the mapping information 300 includes a FAT storing records 301-304 associated with files for three different name spaces. The storage device has a pool of contiguous physical block addresses, identified as blocks 304-319, which are each available for storage of data from any of the three different name spaces.

The record 301 indicates that File #1 is associated with the "public" namespace. Further, record 301 includes data identifying block 304 as the first block of the file. The block 304 stores a first portion of data associated with File #1; the FAT entry for block 304 identifies block 309, which stores a second portion of data associated with File #1. FAT entry 309 identifies block 310, which stores a third portion of data associated with File #1. In some embodiments, the FAT entry for block 310 may include information identifying that the block has no "next" block, i.e., it corresponds with the end of File #1.

The record 302 indicates that File #2 is associated with the "private" namespace. Further, record 302 includes data identifying block 308 as the first block of File #2. FAT entry 308 identifies block 312, which stores the remaining portion of File #2.

The record 303 indicates that File #3 is also associated with the "private" namespace and also identifies block 316 as storing the first portion of File #3. By traversing the FAT index beginning at the block indicated by File #3, a computing device can access blocks 313 and 318, which hold additional portions of the data associated with File #3.

Similarly, record 304 indicates that File #4 is associated with the "application" namespace. The chain of address identifiers associated with record 304 and File #4 can be traversed to access the data a stored in blocks 315 and 319.

In addition to identifying the location of files specified by the FAT based metadata, the mapping information 300 can be utilized to identify free blocks of a storage medium. For example, the mapping information 300 can be traversed or otherwise processed to identify the free blocks 306, 307, 311, 314 and 317. These blocks can then be used to store any combination of data associated with namespaces public, private or application.

As data is deleted from namespaces public, private or application, the mapping information can be updated accordingly to reflect the additional free blocks available on a storage device. For example, File #3 (identified in record 303) may be deleted from namespace "private". The deletion operation frees blocks 313, 316 and 318 for storage of data from any of the namespaces. FIG. 4 illustrates an embodiment of mapping information 400 after the deletion of File #3. As illustrated by the mapping information 400, blocks 306, 307, 311, 313, 314, 316, 317 and 318 are free after the deletion operation.

Figure 5:
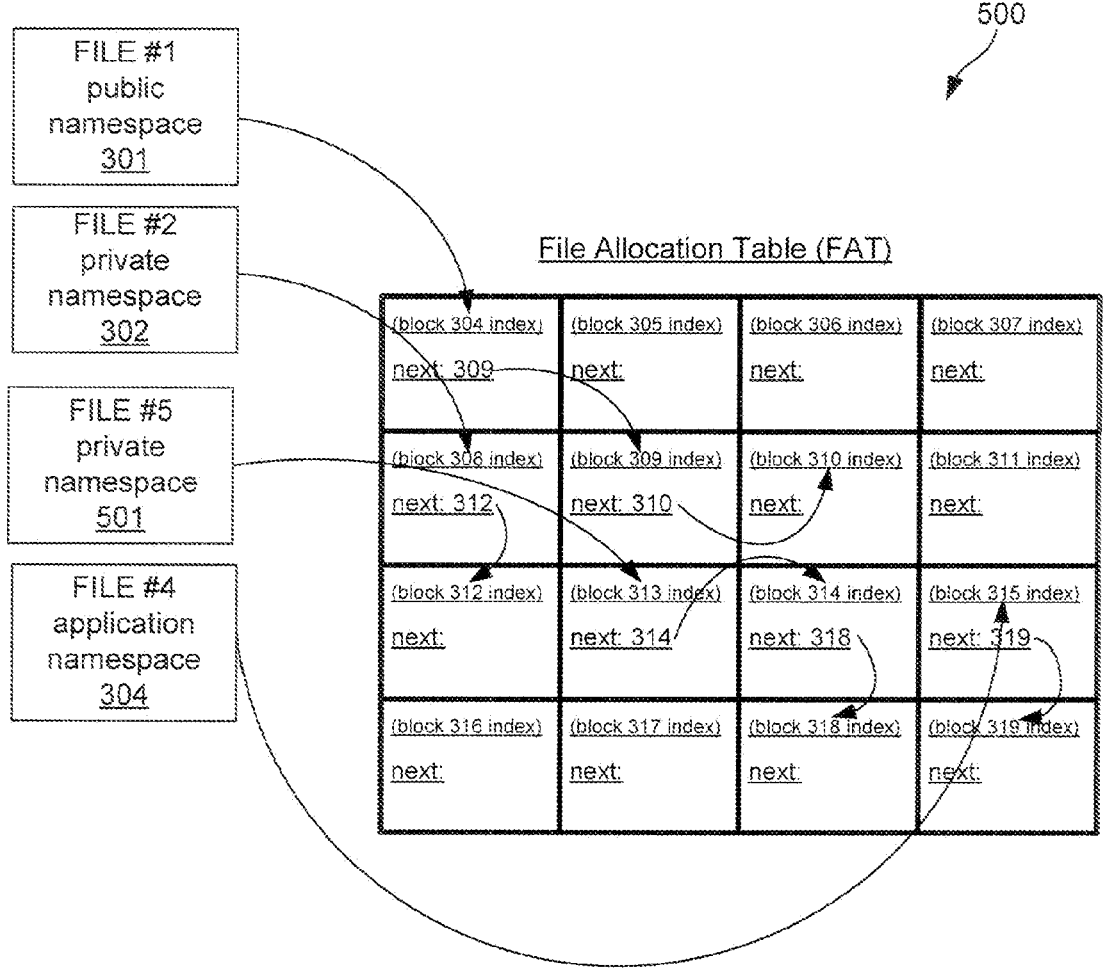
FIG. 5 illustrates an embodiment of mapping information after storage of File #5.

In a subsequent operation, data from a different namespace may be stored in one or more of the blocks freed by the deletion of File #3. For example, File #5, associated with namespace "public", may be stored in blocks 313, 314 and 318. FIG. 5 illustrates an embodiment of mapping information 500 after storage of File #5. As indicated in FIG. 5, a record 501 associated with File #5 identifies the location of block 313 storing a first portion of the file. By traversing the chain headed by the record 501, a computing system can identify the remaining portions of File #5 stored in blocks 314 and 318.

Figure 6:
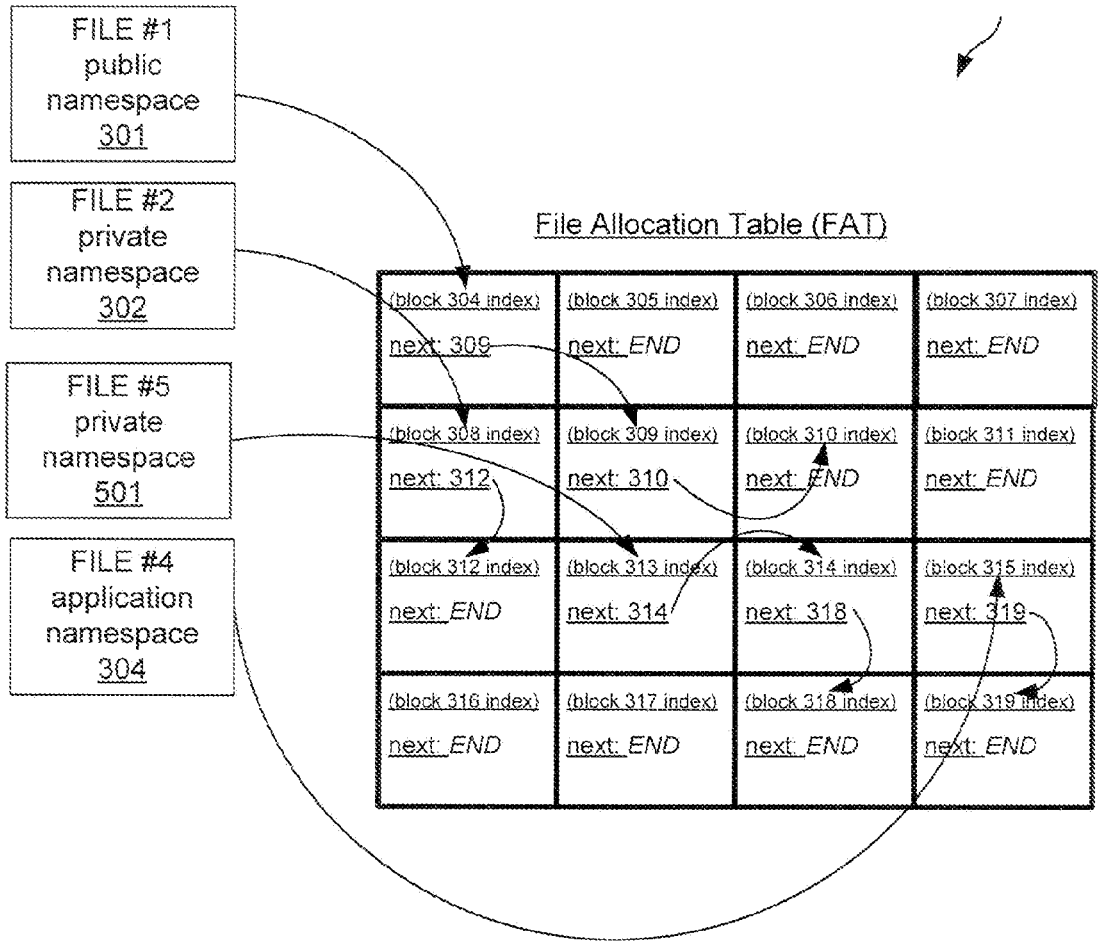
FIG. 6 illustrates an embodiment of mapping information in which the "no next block" or "end" indication is made explicit.

FIG. 6 illustrates an embodiment of mapping information 600 in which the "no next block" or "end" indication is made explicit.

Figure 7:
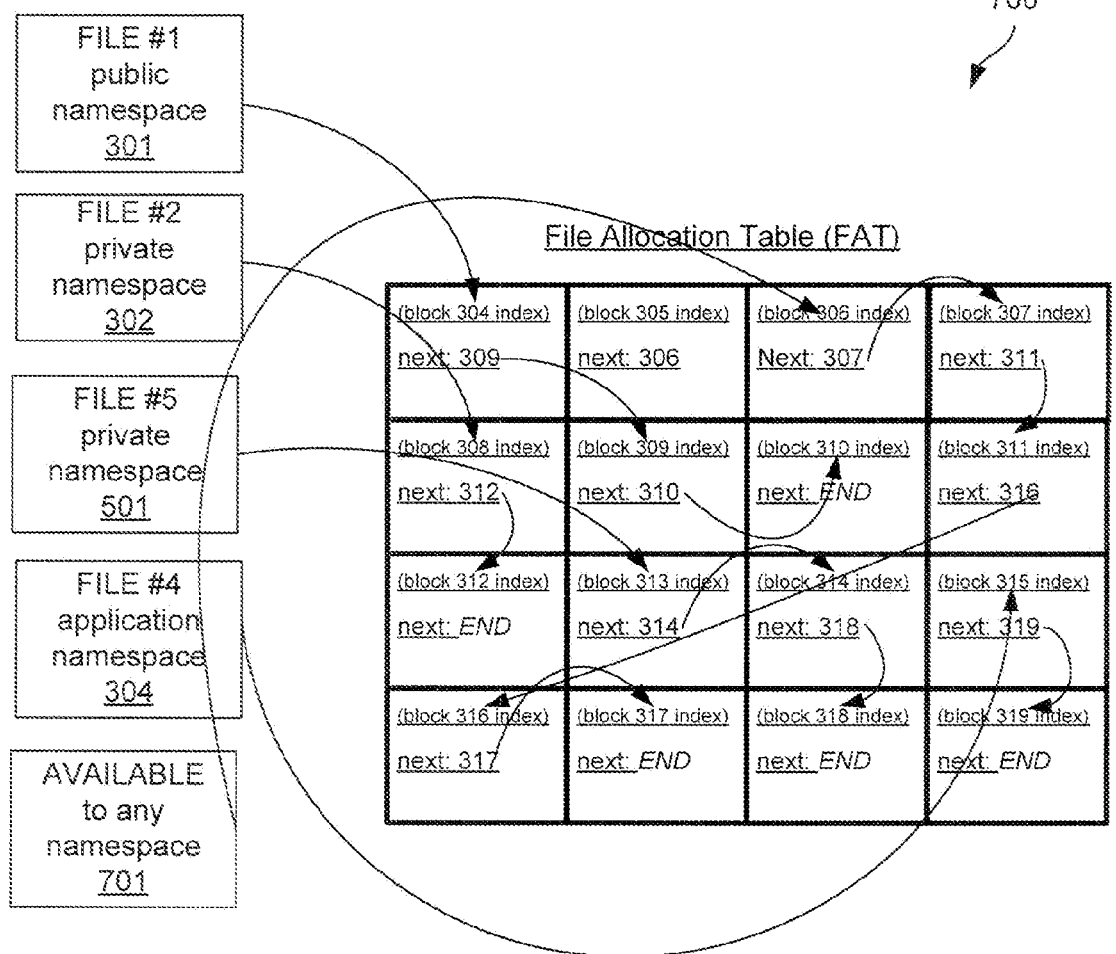
FIG. 7 illustrates an alternate embodiment of mapping information in which unused blocks are collected into a chain of their own, thus making it easier to identify which blocks are not presently allocated.

FIG. 7 illustrates an alternate embodiment of mapping information 700 in which unused blocks are collected into a chain of their own, thus making it easier to identify which blocks are not presently allocated. Thus, the record 701 identifies the free block 307. The FAT can be traversed starting at block 307 to identify other free blocks.

In some embodiments, the above described techniques can be used to allow dynamic allocation of storage space between multiple namespaces while still controlling the capacity of data stored by any namespace. For example, particular namespaces may have an associated storage allocation capacity. Thus, while data from the namespace can be stored in any free block of the storage device, the computing system can determine whether the namespace will exceed its designated capacity before storing particular data to free blocks of the storage device.

For example, a computing system may be embodied as a satellite television receiver with an integrated DVR that includes a 500 GB storage medium for storing both user selected recordings and storing system operator selected content, e.g., pay-per-view (PPV) movies. Further, the user selected recordings may be associated with a namespace having a 350 GB quota whereas the system operator selected content may be associated with a namespace having no quota.

The system operator may store 150 GB of content on the storage medium for on-demand viewing by the user. However, if the user utilizes just 200 GB of the storage capacity, then the system operator may decide to store 200 GB of content on the storage medium. The above described techniques thus allow storage capacity of the storage device to be dynamically allocated to accommodate additional system operator selected content.

On the other hand, the DVR may impose a 350 GB limit on the user selected recordings through a quota limit. Thus, if the system operator selected content has a size of 50 GB at any particular time, 100 GB of the storage medium will be unusable because of the 350 GB limit imposed on the user area. Further, the quota may be dynamically allocable by the DVR. For example, the system operator may charge an additional fee to allow the user to store more content, e.g., 400 or 450 GB of content, increasing the amount made available to the user and decreasing the amount of system operator selected content that can be stored on the drive.

Further, quotas can be imposed on specific nodes of a namespace, e.g., files and directories. For example, a particular folder or file of a namespace can have an associated storage limit budget. Further, the limitations of particular nodes can be separated from the parent node's limits. For example, the parent namespace can have a 1 GB limit and a particular folder can have a separate limit which is not considered part of the 1 GB limit of the parent. In at least one embodiment, the limits of particular nodes can be larger than the parent. For example, the parent node can have a storage limit of 1 GB, whereas a child node can have a storage limit of 2 GB; the child's 2 GB limit is not computed as part of the parent node's storage limit.

In some embodiments, the modification of particular nodes can be performed dynamically. For example, a satellite television provider may transmit commands to a set-top box that modify the limits of particular namespaces and their nodes. In some cases, removing a portion of the budget on a child node may transfer the child node's budget and current usage to the budget of the next upstream node. For example, the folder node public/level1/level2 may have an associated budget of 500 MB. If the limit is later decreased or removed, then the removed portion of the budget may be transferred to the next higher node, e.g. public/level1/, depending on desired design criteria and depending on where the next limit is, e.g. at public/level1/ or at public/.

It is also possible to down-limit an already existing file or folder. For example, a folder or file may have a 1 GB size. The file or folder may be subsequently assigned a 500 MB limit. Thus, the file may subsequently shrink to 500 MB or less, but the file is prohibited from growing unless its size first goes below the 500 MB limit. In at least one embodiment, when the file is down-limited from 1 GB to 500 MB, the other 500 MB of storage budget is transferred to the next higher limited node.

Figure 8:
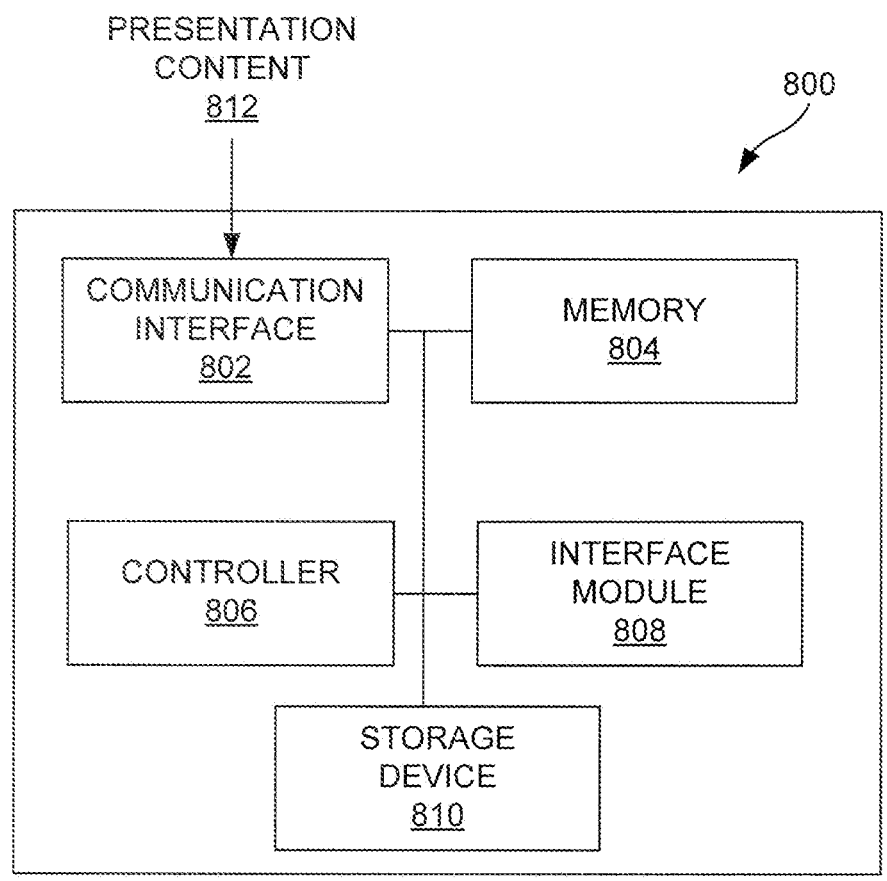
FIG. 8 illustrates an embodiment of an entertainment device.

As described above, the data storage techniques described herein are useful for storing data in an entertainment device, such as a television receiver. FIG. 8 illustrates an embodiment of an entertainment device 800. The entertainment device comprises a communication interface 802, a memory 804, a controller 806, an interface module 808 and a storage device 810. Each of these components will be described in greater detail below. The entertainment device 800 may include other elements, components or devices not illustrated for the sake of brevity.

The communication interface 802 is operable for communicating with an external network. More particularly, the communication interface 802 is operable for receiving presentation content 812 from an external content source. The communication interface 802 may be operable to receive content from the external content source and/or bi-directionally communicate with the content source and/or other devices. The communication interface 802 may communicate with the external content source and/or other devices through any type of wireless or wired communication medium using any type of network topology.

For example, the entertainment device 800 may be part of a larger broadcast or transmission system. More particularly, the entertainment device 800 may comprise a client receiver device of the broadcast system. For example, the entertainment device 800 may comprise a television receiver in a satellite or cable television transmission system.

In at least one embodiment, the communication interface 802 comprises a television tuner operable to receive a radio or television signal from a content source. More particularly, a tuner receives and tunes a transmission signal including television programming and/or radio programming. The tuner may receive an over-the-air broadcast signal, a direct broadcast satellite signal, a cable television signal or an internet protocol television (IPTV) signal and tune the presentation content 812 to extract the selected television programming.

The memory 804 is operable to store settings and other data of the entertainment device 800. The memory 804 may be similar to the memory 114 described in FIG. 1. In at least one embodiment, the memory 804 stores a FAT based metadata describing data stored by the entertainment device 800.

The controller 806 is operable to control the operation of the entertainment device 800. In at least one embodiment, the controller 806 may be similar to the controller 108 described in FIG. 1. The controller 108 may include various components or modules for processing and outputting presentation content, such as audio/video content. Exemplary components or modules for processing audio/video content include a demodulator, a decoder, a decompressor, a conditional access module and a transcoder module.

The controller 806 processes the presentation content 812 to generate an output stream, such as an audio output stream, a video output stream or an audio/video output stream. The output stream is outputted to a presentation device (not shown) for presentation to a user, such as a television, audio receivers, speakers or the like. The controller 806 may incorporate circuitry to output the audio/video streams in any format recognizable by the presentation device, including composite video, component video, Digital Visual Interface (DVI) and HDMI. The controller 806 may also incorporate circuitry to support multiple types of these or other audio/video formats. In at least one embodiment, as described above, the entertainment device 800 may be integrated with the presentation device, such as a television and the controller 806 may be operable to control the presentation of the audio/video output stream.

The interface module 808 is operable to wirelessly receive data from a remote control or other type of input device (not shown in FIG. 8). The interface module 808 may communicate with a remote control or other type of input device utilizing any type of wired or wireless communication link. In at least one embodiment, the interface module 808 receives a key code from a remote control, and responsively provides the key code to the controller 806 for further processing. The controller 806 utilizes the key code to manipulate the output of the presentation content 812.

The storage device 810 is operable to store user selected presentation content and system operator selected content received via the communication interface 802. More particularly, the user selected presentation content is associated with a first namespace of the entertainment device. For example, user selected presentation content may be stored under the namespace "private". The system operator selected content is associated with a second namespace of the entertainment device. For example, the system operator selected content may be stored under the namespace "private". As described above, both types of content are stored in a common pool of memory addresses, e.g., blocks of the storage device 810.

Some of the commands received by the interface module 808 may request to store presentation content 812 received by the entertainment device 812. For example, a user may be watching a particular television program and may desire to record the television program. In other scenarios, the user may set timers that the entertainment device 800 utilizes to record presentation content 812 when the user is not watching the television program. The controller 806 processes the command to store the user selected content, either at the time the command is received or at a later time.

Further, a system operator, such as a satellite broadcaster, transmits content to the entertainment device 800 for storage on the storage device. For example, the system operator may store PPV movies on the storage device 810 that the user may subsequently purchase and watch on-demand. The storage of content on the storage device 810 may be performed with or without the knowledge of the user of the entertainment device 800.

In accordance with the teachings above, the entertainment device 800 maintains a FAT or other type of metadata that describes the data stored on the storage device 810. More particularly, the metadata describes the namespace associated with particular files of data stored on the storage device 810. Thus the storage capacity of the storage device 810 may be dynamically allocated between the two name spaces associated with the user selected content and the network operator selected content.

In other embodiments, there may be multiple namespaces associated with multiple users of the entertainment device 800. For example, in a family of four, the father's account may be associated with a first namespace, the mother's account may be associated with a second namespace and each of the children's accounts may be associated with separate namespaces. Thus, the entertainment device 800 may dynamically allocate storage capacity of the storage device 810 by using the file storage techniques described herein. In some embodiments, quotas may be imposed upon particular namespaces in accordance with the teachings described above.

Those of ordinary skill in the art will appreciate that the various functional elements 802 through 810 shown as operable within the entertainment device 800 may be combined into fewer discrete elements or may be broken up into a larger number of discrete functional elements as a matter of design choice. Thus, the particular functional decomposition suggested by FIG. 8 is intended merely as exemplary of one possible functional decomposition of elements within the entertainment device 800.

Figure 9:
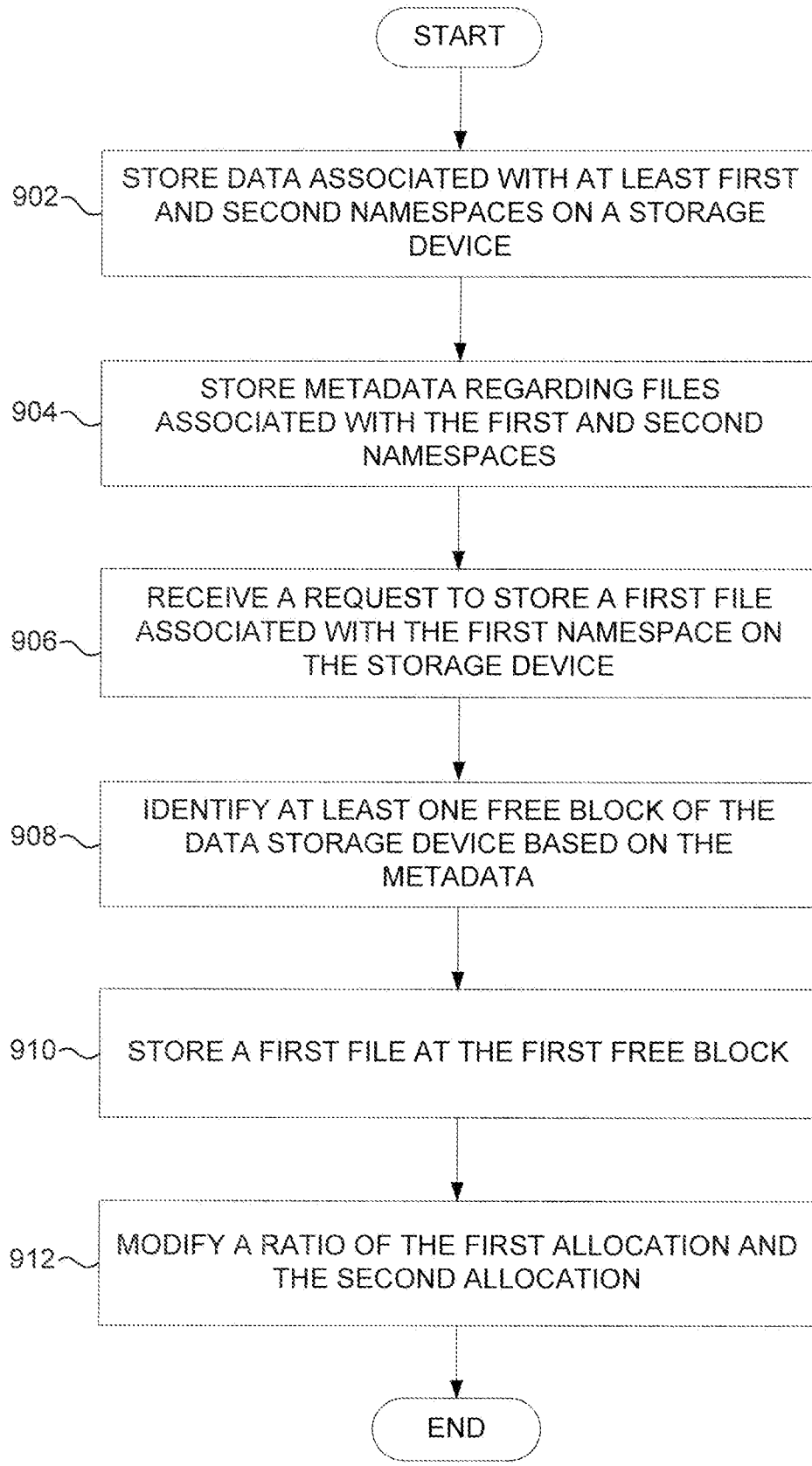
FIG. 9 illustrates an embodiment of a process for dynamically allocating storage between multiple namespaces.

FIG. 9 illustrates an embodiment of a process for dynamically allocating storage between multiple namespaces. The process of FIG. 9 may be performed by a controller of any type of computing device, such as a computer, server or the like. In other embodiments, the process of FIG. 9 may be performed by a memory controller of a storage device, such as a disk drive and may be masked from the operation of the general computing device or host system. The process of FIG. 9 may include other operations not illustrated for the sake of brevity.

The process includes storing data associated with at least first and second namespaces on a storage device (operation 902). The storage device has an associated storage capacity which may be allocated between the two namespaces. In at least one embodiment, the first namespace may be initially allocated a first allocation of the storage capacity and the second namespace may be initially allocated a second allocation of the storage capacity. For example, a 100 GB storage medium may include 50 GB of capacity allocated to the first namespace and 50 GB of capacity allocated to the second namespace.

The process further includes storing metadata regarding files associated with the first and second namespaces (operation 904). More particularly, the metadata includes information identifying the namespaces and a block of the storage device associated with a particular file. In at least one embodiment, the metadata is stored in a FAT associated with the storage device. As described above, a single FAT may be utilized to store metadata regarding multiple namespaces.

The process further includes receiving a first request to store a first file associated with the first namespace on the data storage device (operation 906). Responsive to receiving the request, the process includes identifying at least one free first block of the data storage device based on information in the FAT (operation 908). If the first file is larger than the size of a single block, then operation 908 may include identifying multiple free blocks of the storage device. In at least one embodiment, operation 908 may include identifying a free block or free blocks that previously stored files associated with the second namespace, e.g., a second file. More particularly, the second file may have been stored in the free block since a last partitioning of the storage device. Once the second file was deleted from the second namespace, the blocks associated with the second file become available for storage of data from either the first namespace or the second namespace.

The process further includes storing a first file at the first free block (operation 910). If there are multiple free blocks, then operation 910 comprises storing the first file at the multiple free blocks identified in operation 908. The process further includes modifying the information in the FAT to associate the free block with the first file and the namespace. If multiple blocks are used to store the first file, then the FAT may be updated to reflect any other blocks used to store the first file as well.

The process further includes modifying a ratio of the first allocation and the second allocation based on a size of the free block or free blocks used to store the first file and/or the number of blocks used to store the first file (operation 912). For example, prior to receiving the request in step 906, the first namespace may include a total of 50 GB of data stored on the storage device. On the other hand, the second namespace may include a total of 20 GB of data stored on the storage device. If the first file requested to be stored in operation 906 has a size of 5 GB, then the operation of 912 will change the allocation ratio of the namespaces from 50 GB/50 GB to 55 GB/45 GB.

Subsequent operations may be performed to store other files associated with either namespace. These subsequent operations may or may not change the allocation ratio of storage capacity for the namespaces. For example, the process may include receiving a second request to store a third file associated with the second namespace. Responsive to the request, at least one second free block is identified based on information in the FAT and the third file is stored at the second free block. In at least one embodiment, the second free block may be physically contiguous to the first free block or any of the blocks storing the first file. In association with storing the third file, the information in the FAT is modified to associate the second free block with the third file and the second namespace.

In the further operations for the described example, the allocation ratio of storage capacity associated with the namespaces does not change and remains 55 GB/45 GB unless certain conditions are meet. For example, additional data stored for one of the namespaces may change the allocation ratio between the two namespaces. In some embodiments, the allocation ratio of storage capacity for two or more namespaces is not modified unless the size of data associated with a namespace is at least equal to the allocation of storage capacity for the namespace. Thus, in at least one embodiment, a ratio of a first allocation and a second allocation of storage capacity between multiple namespaces remains the same unless the size of data associated with either the first or second namespace is at least equal to the associated allocation of storage capacity. If the preceding condition is true, then the allocation ratio may be modified based on a size of a block or blocks used to store a particular file for one of the namespaces.

Through the operation of the process of FIG. 9, storage capacity of a storage device may be dynamically allocated between multiple namespaces. Thus, if the storage capacity of a first namespace is exceeded, then the storage capacity of a second namespace may be utilized, if available, to accommodate storage of a file of the first namespace. This allows for more efficient use of the overall storage capacity of a storage device partitioned into multiple namespaces.

Figure 10:
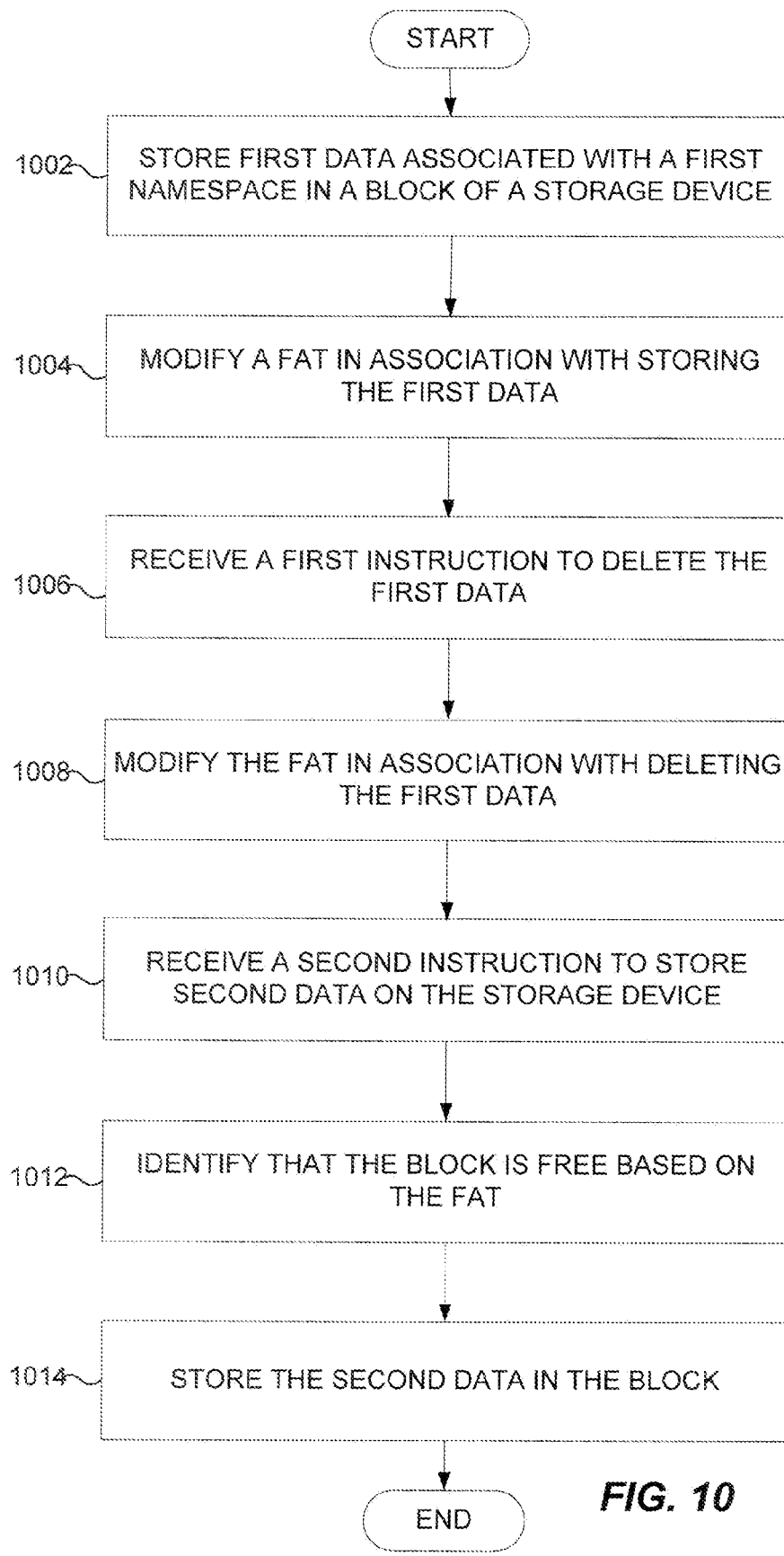
FIG. 10 illustrates another embodiment of a process for dynamically allocating storage between multiple namespaces.

FIG. 10 illustrates another embodiment of a process for dynamically allocating storage between multiple namespaces. Like the process of FIG. 9, the process of FIG. 10 may be performed by a controller of any type of computing device or a memory controller of a storage device. The process of FIG. 10 may include other operations not illustrated for the sake of brevity.

The process includes storing first data associated with a first namespace in a block of a storage device (operation 1002). The process further includes modifying a FAT in association with storing the first data (operation 1004). The FAT includes information identifying that the block is associated with the first data and the first namespace.

The process further includes receiving a first instruction to delete the first data (operation 1006). The process further includes modifying the FAT in association with deleting the first data (operation 1008). Thus, the block becomes available for storage of data associated with the first namespace or another namespace associated with the storage device.

The process further includes receiving a second instruction to store second data on the storage device (operation 1010). More particularly, the second data is associated with the second namespace. The process further includes identifying that the block is free based on the FAT (operation 1012).

Responsive to identifying that the block is free, the process includes storing the second data in the block (operation 1014). The process further includes modifying the FAT in association with storing the second data (operation 1016). The updated FAT includes information identifying that the block is associated with the second data and the second namespace.

In some embodiments, the teachings described herein may be utilized for providing redundant array of independent disks (RAID) storage capability. The aforementioned metadata can be further encoded to include RAID level, e.g., whether parity has been used. Thus, data can be stored on a storage device without imposing positional dependency on the data. For example, data from the same RAID stripe may be stored anywhere on die storage medium rather than in predefined positions. The data may be accessed and processed using the metadata stored in the FAT.

Although specific embodiments were described herein, the scope of the invention is not limited to those specific embodiments. The scope of the invention is defined by the following claims and any equivalents therein.

I claim:

1. A data storage system, comprising:
a common data storage device comprising a first data storage region with an associated storage capacity and a second data storage region, wherein the first data storage region of the common data storage device is configured to store files associated with at least a public namespace and a private namespace that is separate from the public namespace, the public namespace having a first allocation of the storage capacity within the first data storage region and the private namespace having a second allocation of the storage capacity within the same first data storage region of the common data storage device as the first allocation of storage capacity so that both the public namespace and the private namespace represent different regions of the same common data storage device, and wherein files associated with the public namespace are separately addressable from files stored in the private namespace;
wherein the second data storage region of the common data storage device is configured to store metadata regarding each of the files associated with the public and private namespaces, the metadata identifying, for each of the files, the namespace that the file is associated with, and a block of the first data storage region that is associated with the particular file; and a controller communicatively coupled to the first storage region and the second data storage region, the controller configured to:
- receive a first request to store a first file associated with the public namespace in the first data storage region;
- identify at least one free block of the first data storage region based on the metadata, the free block previously storing a second file associated with the private namespace;
- store the first file at the free block;
- modify the ratio of the relative sizes of the first allocation and the second allocation based on a size of the free block to thereby dynamically allocate the associated storage capacity of the first data storage region of the common data storage device between files associated with the public namespace and files associated with the private namespace; and
- modify the metadata to associate the free block with the first file and the private namespace.

2. The data storage system of claim 1, wherein the free block comprises a portion of a common pool of storage blocks associated with the public and private namespaces.

3. The data storage system of claim 2, wherein the controller is further configured to:
- receive a second request to delete the first file; and
- modify the metadata responsive to the second request, the information indicating that the free block is available for storage of data associated with either the public namespace or the private namespace.

4. The data storage system of claim 1, wherein the free block is physically contiguous to first and second blocks storing data associated with the private namespace.

5. The data storage system of claim 1, wherein a size of data associated with the public namespace is less than the first allocation of the storage capacity when the controller identifies the free block.

6. The data storage system of claim 1, wherein the first data storage region and the second data storage region comprise portions of non-volatile memory.

7. A data storage system comprising:
- a common data storage device having a first data storage region and a second storage region, wherein the first storage region includes a common pool of storage blocks associated with at least a public namespace and a private namespace that is separate from the public namespace so that both the public namespace and the private namespace represent different regions of the same common data storage device, and wherein files associated with the public namespace are separately addressable from files stored in the private namespace, and wherein the second data storage region stores a file allocation table including a plurality of records associated with files in the public and private namespaces, each record identifying a particular file stored in the first data storage region, at least one of the storage blocks associated with the particular file and one of the public and private namespaces associated with the particular file; and
- a controller communicatively coupled to the storage device, the controller configured to dynamically adjust a ratio of the relative sizes of the public namespace and the private namespace by allocating the associated storage capacity of the first data storage region of the storage device between files associated with the public namespace and files associated with the namespace by:
  - receiving a first request to store a first file associated with the public namespace;
  - storing the first file at a first storage block;
  - modifying a first record in the file allocation table associated with the first file, the first record referencing the first storage block and the public namespace;
  - receiving a second request to store a second file associated with the private namespace;
  - storing the second file at a second storage block; and
  - modifying a second record in the file allocation table associated with the second file, the second record referencing the second storage block and the private namespace.

8. The data storage system of claim 7, wherein the controller is further configured to:
- receive a third request to delete the first file;
- modify the file allocation table responsive to the third request;
- receive a fourth request to store a third file associated with the private namespace;
- store the third file at the first storage block;
- modify a third record in the file allocation table associated with the third file, the third record referencing the first storage block and the private namespace.

9. The data storage system of claim 7, wherein the first storage block and the second storage block are contiguous physical blocks of the first data storage region.

10. A method of dynamically allocating storage between multiple namespaces residing on a common data storage device having an associated storage capacity, the method comprising:
- storing data associated with at least public and private namespace on the common storage device, the public namespace having a first allocation of the storage capacity and the private namespace having a second allocation of the storage capacity;
- storing a file allocation table including information regarding files associated with the public and private namespaces, the information identifying the namespace and a block of the common storage device associated with a particular file;
- receiving a first request to store a first file associated with the public namespace in the first data storage region;
- identifying at least one first free block of the first data storage region based on the information in the file allocation table, the first free block previously storing a second file associated with the private namespace;
- storing the first file at the first free block;
- modifying a ratio of the relative sizes of the first allocation and the second allocation based on a size of the first free block to thereby dynamically allocate the associated storage capacity of the shared storage device between files associated with the public namespace and files associated with the namespace; and
- modifying the information in the file allocation table to associate the first free block with the first file and the private namespace.

11. The method of claim 10, further comprising:
- receiving a second request to store a third file associated with the private namespace in the first data storage region;
- identifying at least one second free block of the first data storage region based on the information in the file allocation table, the second free block being physically contiguous to the first free block;

storing the third file at the second free block; and modifying the information in the file allocation table to associate the second free block with the third file and the private namespace.

12. The method of claim 10, wherein the first free block comprises a portion of a common pool of storage blocks associated with the public and private namespaces.

13. The method of claim 10, further comprising:
receiving a second request to delete the first file;
modifying the information in the file allocation table responsive to the second request, the information indicating that the free block is available for storage of data associated with either the public namespace or the private namespace.

14. The method of claim 10, wherein the first data storage region and the second data storage region comprise portions of non-volatile memory.

15. A method of dynamically allocating storage capacity between multiple namespaces on a common storage device, the method comprising:
storing first data associated with a public namespace in a block of the common storage device, the public namespace having a first allocation of the storage capacity;
modifying a file allocation table in association with storing the first data, the file allocation table including information identifying that the block is associated with the first data and the public namespace;
receiving a first instruction to delete the first data;
modifying the file allocation table in association with deleting the first data;
receiving a second instruction to store second data on the common storage device, the second data associated with a private namespace that resides on the same common storage device as the public namespace, but that is separately addressable from the public namespace, the private namespace having a second allocation of the storage capacity;
identifying that the block previously associated with the first data is free based on the file allocation table;
identifying that a size of data associated with the private namespace is at least equal to the second allocation of the storage capacity;
storing the second data in the block previously associated with the first data;
modifying a ratio of the first allocation and the second allocation based on a size of the data; and
modifying the file allocation table in association with storing the second data, the modified file allocation table including information identifying that the block of the common storage device that was previously associated with the first data and the public namespace is now associated with the second data and the private namespace.

16. The method of claim 15, wherein identifying the block is performed responsive to determining that a size of data associated with the private namespace is less than the second allocation of the storage capacity.

17. An entertainment device comprising:
a communication interface that receives presentation content from an external network;
a common data storage device configured to comprise a first data storage region and a second data storage region, wherein the first data storage region comprises a common pool of storage blocks associated with at least public and private namespaces that are distinct from each other so that both the public namespace and the private namespace represent different regions of the same common data storage device, and wherein files associated with the public namespace are separately addressable from files stored in the private namespace, the public namespace being associated with user selected content and the private namespace being associated with system operator selected content, and wherein the second data storage region stores a file allocation table including a plurality of records associated with files in the public and private namespaces, each record identifying a particular file stored in the first data storage region of the common data storage device, wherein the particular file is associated with at least one of the storage blocks and with one of the public and private namespaces associated with the particular file; and
a controller communicatively coupled to the communication interface and the common data storage device, wherein the controller is configured to dynamically allocate the common pool of storage blocks on the common data storage device between files associated with the public namespace and files associated with the private namespace and thereby adjust a ratio of the relative sizes of the public and private namespaces by:
receiving a first request to store user selected content;
storing the user selected content at a first storage block;
modifying a first record in the file allocation table associated with the first selected content, the first record referencing the first storage block and the public namespace;
receiving a second request to store first system operator selected content received via the communication interface from the external network;
storing the first system operator selected content at a second storage block;
modifying a second record in the file allocation table associated with the user system operator selected content, the second record referencing the second storage block and the private namespace; and
outputting for presentation at least one of the user selected content and the first system operator selected content.

18. The entertainment device of claim 17, wherein the presentation content comprises video content.

19. The entertainment device of claim 17, wherein the communication interface comprises a television tuner, and wherein the user selected content comprises a television transmission.

20. The entertainment device of claim 17, wherein the controller is further configured to:
receive a third request to delete the user selected content;
modify the file allocation table responsive to the third request;
receive a fourth request to store second system operator selected content;
store the second system operator selected content at the first storage block;
modify a third record in the file allocation table associated with the second system operator selected content, the third record referencing the second system operator selected content and the private namespace.

21. The entertainment device of claim 17, wherein the first block and the second block are contiguous physical blocks of the first data storage region.

* * * * *